April 20, 1948.　　　G. J. MULLER　　　2,440,181
PICKER STICK
Filed Dec. 11, 1945
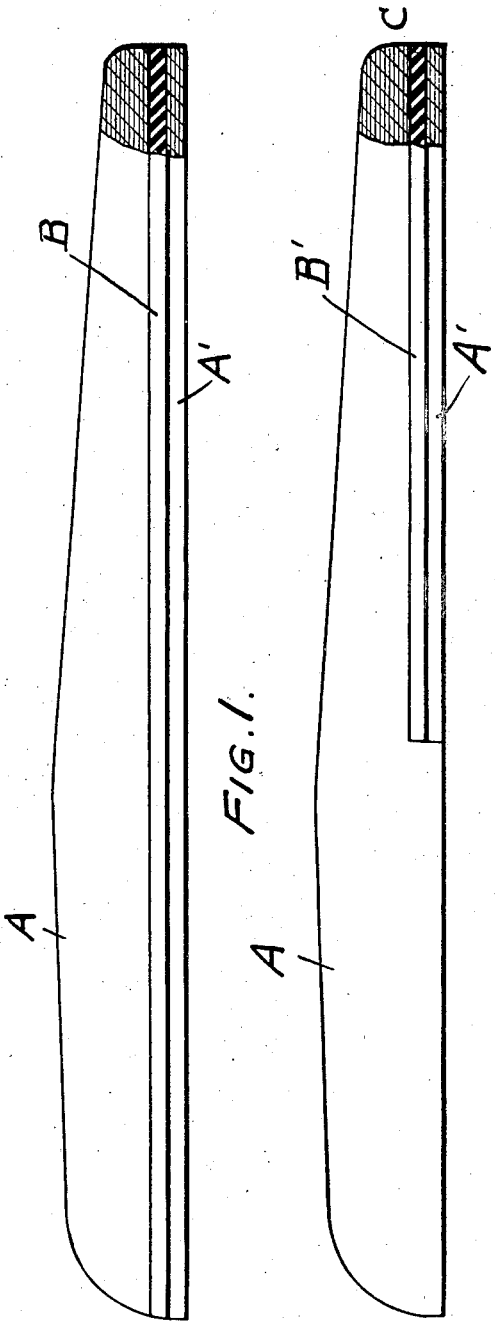
INVENTOR
George J. Muller
BY
ATTORNEYS.

Patented Apr. 20, 1948

2,440,181

UNITED STATES PATENT OFFICE 2,440,181

PICKER STICK

George J. Muller, Philadelphia, Pa., assignor to Taylor Fibre Company, Norristown, Pa., a corporation of Pennsylvania Application December 11, 1945, Serial No. 634,160

2 Claims. (Cl. 139—157)

This invention relates to an improvement in picker sticks for looms.

One of the objects of my invention is the provision of a composite picker stick which will take up the shock caused by the shuttle striking the picker, absorb the vibration caused by the shock, and which will have sufficient rigidity to throw the shuttle without undue lag after the stick has been actuated to throw the shuttle.

Another object of my invention is the provision of a stick which will have all of the desired qualities of a hickory stick, but which will be more shock absorbing and at the same time have the required rigidity to throw the shuttle.

The above objects are obtained by forming a laminated stick in which the body member of the stick and a relatively thin facing member, both formed of molded fibrous material and a phenol formaldehyde resin or other thermosetting resin, and a strip or a plurality of strips of rubber or other resilient material between the body member and the facing strip.

Having thus set forth the objects of my invention, I will proceed, for illustrative purposes, to a detailed description of several preferred embodiments thereof with reference to the accompanying drawings, in which:

Fig. 1 is a side elevation of a stick with a portion in section, constructed in accordance with my invention;

Fig. 2 is a similar view of another form of stick constructed in accordance with my invention; and Fig. 3 is a similar view of still another form of stick constructed in accordance with my invention.

Each of the sticks illustrated in Figs. 1 to 3 comprises a main or body portion A and a facing strip A' formed of phenol fibre and comprising paper or fabric strips laid up, compressed and cured in the usual manner, and an interposed strip or strips of rubber interposed between the facing strip A' and the main or body portion A.

In the form shown in Fig. 1, a single rubber strip B which extends the full length of the stick and is interposed between the facing strip A' and the body portion A.

Fig. 2 is similar to Fig. 1, but in this form both the rubber strip B' and the facing strip A' merely extend from the picker end C of the stick to a point adjacent the central portion of the stick.

In Fig. 3 the width of the body portion A is less than shown in Fig. 1 for a stick of the same dimensions, and interposed between the facing strip A' and the body portion A are two strips of rubber $B^2$ and $B^3$ with a strip $A^2$ of phenol fibre interposed between them of less thickness than the facing strip A'.

In all of the forms, the members A, A' and $A^2$ are shaped to their completed form, as well as the rubber strips, and the parts are then cemented to each other by means of hot set phenol formaldehyde adhesive, modified polyvinal acetate adhesive, modified furfural resin adhesive or any other cement having sufficient bonding qualities for bonding the members to each other.

The one end of each of the sticks shown is shaped to receive a picker and the shock received by the picker when struck by the shuttle is first received by the facing strip A and instead of the shock and vibrations being transmitted directly to the entire stick as in a hickory picker stick, both the shock and vibrations transmitted to the body portion A from the facing strip A' are materially reduced while passing through the interposed rubber strip or strips.

The advantages of my invention result from the provision of means whereby the shock and vibrations to a picker stick caused by a shuttle striking of the picker is greatly reduced, which not only reduces the vibrations in the stick but also reduces the vibrations transmitted to the loom through the picker stick connections to the frame of the loom, which greatly reduces the vibrations of each loom transmitted to the floor of the building.

A further advantage results from the provision of a picker stick whose life is materially increased over that of other known sticks by the reduction of the shock to the stick due to the interposed rubber strip or strips.

What I claim and desire to protect by Letters Patent is:

1. A picker stick having a body portion formed of strips of phenol fibre, a facing strip extending over at least a portion of the side thereof facing the striking portion of the picker, and a rubber strip interposed between the facing strip and the body portion for absorbing shock, both the facing strip and the rubber strip being relatively thin when compared to the thickness of the body.

2. A picker stick having a body portion formed of laminated strips of phenol fibre, a facing formed of laminated strips of phenol fibre on the face of the body facing the striking portion of the picker, and a strip of rubber between the facing strip and body portion for absorbing shock, the facing strip and strip of rubber extending the full length of the stick, said strips being relatively thin when compared to the thickness of the body portion."

GEORGE J. MULLER.

REFERENCES CITED

The following references are of record in the file of this patent:

UNITED STATES PATENTS

| Number | Name | Date |
|---|---|---|
| 870,904 | Rossignol | Nov. 12, 1907 |
| 1,372,727 | Sternberger | Mar. 29, 1921 |
| 2,389,595 | Carter | Nov. 27, 1945 |

FOREIGN PATENTS

| Number | Country | Date |
|---|---|---|
| 19,728 | Great Britain | 1892 |
| 335,400 | Great Britain | Sept. 25, 1930 |
| 352,522 | Great Britain | July 13, 1931 |
| 369,155 | France | Oct. 31, 1906 |